(12) United States Patent
Tanabe et al.

(10) Patent No.: US 11,682,516 B2
(45) Date of Patent: Jun. 20, 2023

(54) REACTOR COOLING STRUCTURE (71) Applicant: DENSO CORPORATION, Kariya (JP)

(72) Inventors: Ryota Tanabe, Kariya (JP); Tatsuya Murakami, Kariya (JP); Hiroshi Shimizu, Kariya (JP); Naoki Hirasawa, Nisshin (JP)

(73) Assignee: DENSO CORPORATION, Kariya (JP)

( * ) Notice: Subject to any disclaimer, the term of this patent is extended or adjusted under 35 U.S.C. 154(b) by 425 days.

(21) Appl. No.: 16/784,514

(22) Filed: Feb. 7, 2020

(65) Prior Publication Data

US 2020/0176168 A1 Jun. 4, 2020

Related U.S. Application Data (63) Continuation of application No. PCT/JP2018/030007, filed on Aug. 10, 2018.

(30) Foreign Application Priority Data

Aug. 10, 2017 (JP) .............................. JP2017-156085

(51) Int. Cl.
*H01F 27/10* (2006.01)
*H01F 27/255* (2006.01)
(Continued)

(52) U.S. Cl.
CPC ........... *H01F 27/10* (2013.01); *H01F 27/255* (2013.01); *H01F 37/00* (2013.01); *H02M 7/48* (2013.01)

(58) Field of Classification Search
CPC ................................ H01F 27/10; H01F 27/255
(Continued)

(56) References Cited

U.S. PATENT DOCUMENTS 9,723,764 B2 *  8/2017 Sugita ................ H05K 7/20927
9,986,665 B2 *  5/2018 Kosaka ................... H05K 7/209
(Continued)

FOREIGN PATENT DOCUMENTS

CN  109841890 A  *  6/2019  ............... B60K 1/04
CN  108666605 B  *  9/2021  ........... B60L 11/1896
(Continued)

OTHER PUBLICATIONS

Sep. 18, 2018 International Search Report issued in International Patent Application No. PCT/JP2018/030007.

*Primary Examiner* — Mang Tin Bik Lian
*Assistant Examiner* — Joselito S. Baisa
(74) *Attorney, Agent, or Firm* — Oliff PLC (57) ABSTRACT

A reactor cooling structure includes: a plurality of reactors that are stacked on one another, each reactor including a coil configured to produce magnetic flux when energized; and a cooling mechanism that cools the plurality of reactors, wherein each of the reactors has an exterior member that has: heat radiation surfaces respectively on both sides of the corresponding one of the reactors in a stacking direction of the stacked reactors i.e. a first direction, the heat radiation surfaces of the exterior member of each of the reactors being arranged to cool the coil of the corresponding one of the reactors; the cooling mechanism includes a cooling flow path for directly cooling the first and second heat radiation surfaces of the exterior member of each of the reactors by a refrigerant.

15 Claims, 10 Drawing Sheets

(51) Int. Cl.
*H01F 37/00* (2006.01)
*H02M 7/48* (2007.01)

(58) Field of Classification Search
USPC .......................................................... 336/55
See application file for complete search history.

(56) References Cited

U.S. PATENT DOCUMENTS

| | | | | |
|---|---|---|---|---|
| 10,141,862 B1* | 11/2018 | Chen | ................... | H05K 7/2089 |
| 10,548,246 B2* | 1/2020 | Takeuchi | ............ | H05K 7/20872 |
| 11,183,949 B2* | 11/2021 | Ichijo | ................... | H02M 7/537 |
| 11,191,192 B2* | 11/2021 | Takeuchi | ............. | H01L 23/4012 |
| 2006/0096299 A1 | 5/2006 | Mamitsu et al. | | |
| 2007/0295715 A1* | 12/2007 | Saka | ....................... | H01F 37/00 |
| | | | | 219/624 |
| 2014/0292457 A1* | 10/2014 | Shinohara | ............. | H01F 27/306 |
| | | | | 336/83 |
| 2015/0152987 A1* | 6/2015 | Ishikawa | ............ | H05K 7/20927 |
| | | | | 285/350 |
| 2015/0357109 A1 | 12/2015 | Nobusaka et al. | | |
| 2016/0227677 A1* | 8/2016 | Hirasawa | ............ | H01F 27/2823 |
| 2020/0204085 A1* | 6/2020 | Ichijo | ..................... | H02M 7/537 |

FOREIGN PATENT DOCUMENTS

| | | | | |
|---|---|---|---|---|
| CN | 109935447 B | * | 10/2021 | ............. H01F 27/10 |
| EP | 3544396 B1 | * | 9/2022 | ............. H01F 27/28 |
| JP | 2006-165534 A | | 6/2006 | |
| JP | 2009049082 A | * | 3/2009 | |
| JP | 2009218417 A | * | 9/2009 | |
| JP | 2011181856 A | * | 9/2011 | |
| JP | 2014099488 A | * | 5/2014 | |
| JP | 5640497 B2 | * | 12/2014 | |
| JP | 2015-095563 A | | 5/2015 | |
| JP | 2015170674 A | * | 9/2015 | |
| JP | 2016-157733 A | | 9/2016 | |
| JP | 2016163478 A | * | 9/2016 | |
| JP | 2016-197987 A | | 11/2016 | |
| JP | 2017152612 A | * | 8/2017 | |
| JP | 2017174884 A | * | 9/2017 | |

\* cited by examiner

REACTOR COOLING STRUCTURE

CROSS-REFERENCE TO RELATED APPLICATION

The present application is a continuation application of International Application No. PCT/JP2018/030007, filed Aug. 10, 2018, which claims priority to Japanese Patent Application No. 2017-156085 filed on Aug. 10, 2017. The contents of these applications are incorporated herein by reference in their entirety.

BACKGROUND

Technical Field

The present disclosure relates to a structure for cooling a reactor.

Background Art

A power converter including a plurality of reactors is disclosed in the prior art.

SUMMARY

In the present disclosure, provided is a reactor cooling structure as the following. In the reactor cooling structure, each of reactors has an exterior member that has: first heat radiation surfaces respectively on both sides of the corresponding one of the reactors in a stacking direction of stacked reactors; and second heat radiation surfaces respectively on both sides of the corresponding one of the reactors in a direction perpendicular to the stacking direction, the first and second heat radiation surfaces of the exterior member of each of the reactors being arranged to cool coil of the corresponding one of the reactors; the cooling mechanism includes a cooling flow path for directly cooling the first and second heat radiation surfaces of the exterior member of each of the reactors by a refrigerant; and all the first and second heat radiation surfaces of each of the reactors are arranged to face the cooling flow path, the heat radiation surfaces being made of a predetermined material.

BRIEF DESCRIPTION OF THE DRAWINGS

The foregoing and other objects, features, and advantages of the present disclosure will be more clarified by the following detailed descriptions with reference to the accompanying drawings. The drawings are as follows.

DETAILED DESCRIPTION OF THE PREFERRED EMBODIMENTS

PTL 1 shown below discloses a power converter including a plurality of reactors. In this power converter, the plurality of reactors is stacked on one another. The reactors and heat radiators are alternately stacked in a predetermined stack direction, so that a corresponding adjacent pair of the heat radiators is respectively arranged on both sides of each reactor. Accordingly, the heat generated by each reactor is radiated via the heat radiators of the corresponding adjacent pair from both sides of the corresponding reactor. In addition, to enhance the performance of cooling the reactors, the heat radiators are provided with a refrigerant flow path in which a refrigerant is to flow.

[PTL 1] JP 2016-197987 A

In the power converter as described above, it is necessary to ensure a space for arranging the heat radiators and their accompanying members on each side of each reactor in the stacking direction, which makes it difficult to miniaturize the power converter. In addition, for designing of this kind of power converter, there is a demand for further enhancing the performance of cooling the reactors due to higher power output of power converters in recent years.

The present disclosure is to provide a reactor cooling structure that exerts high performance in cooling reactors and is effective for miniaturization.

An aspect of the present disclosure is a reactor cooling structure that includes: a plurality of reactors that are stacked on one another, each reactor including a coil configured to produce magnetic flux when energized; and a cooling mechanism that cools the plurality of reactors, wherein, each of the reactors has an exterior member that has: first heat radiation surfaces respectively on both sides of the corresponding one of the reactors in a stacking direction of the stacked reactors; and second heat radiation surfaces respectively on both sides of the corresponding one of the reactors in a direction perpendicular to the stacking direction, the first and second heat radiation surfaces of the exterior member of each of the reactors being arranged to cool the coil of the corresponding one of the reactors; the cooling mechanism includes a cooling flow path for directly cooling the first and second heat radiation surfaces of the exterior member of each of the reactors by a refrigerant; and all the first and second heat radiation surfaces of each of the reactors are arranged to face the cooling flow path, the heat radiation surfaces being made of a predetermined material.

Advantageous Effects of the Invention

In the reactor cooling structure, the heat radiation surfaces of exterior member of each reactor is directly cooled by the refrigerant. In this case, the refrigerant flowing through the cooling flow path of the cooling mechanism directly contacts the heat radiation surfaces of the exterior member. That is, there is no member interposed between the heat radiation surfaces of the exterior member and the refrigerant flowing through the cooling flow path. This enhances the performance in cooling the reactors as compared to a structure in which another member is interposed between the heat radiation surfaces of the exterior member and the refrigerant. In addition, for enhancing the performance, there is no need to apply pressure to the exterior members of the reactors to press the exterior members against the cooling mechanism.

Further, it is possible to reduce the dimension of the reactor cooling structure in the stacking direction due to the absence of another member interposed between the heat radiation surfaces of the exterior members and the refrigerant.

As above, according to the foregoing aspect, it is possible to provide a reactor cooling structure that exerts high performance in cooling reactors and is effective for miniaturization.

The reference signs parenthesized in the claims and the means for solving the problem section represent correspondence with specific means described later in relation to embodiments, and are not intended to limit the technical scope of the present disclosure.

Hereinafter, an embodiment of a cooling structure for cooling reactors will be described with reference to the drawings.

In the drawings accompanying the specification, unless otherwise specified, a first direction as a stacking direction of a plurality of reactors is indicated by an arrow X, a second direction that is a stacking direction of a plurality of semiconductor modules constituting a power conversion apparatus together with the plurality of reactors and is orthogonal to the first direction X is indicated by an arrow Y, and a third direction orthogonal to both the first direction X and the second direction Y is indicated by an arrow Z.

First Embodiment

Figure 1:
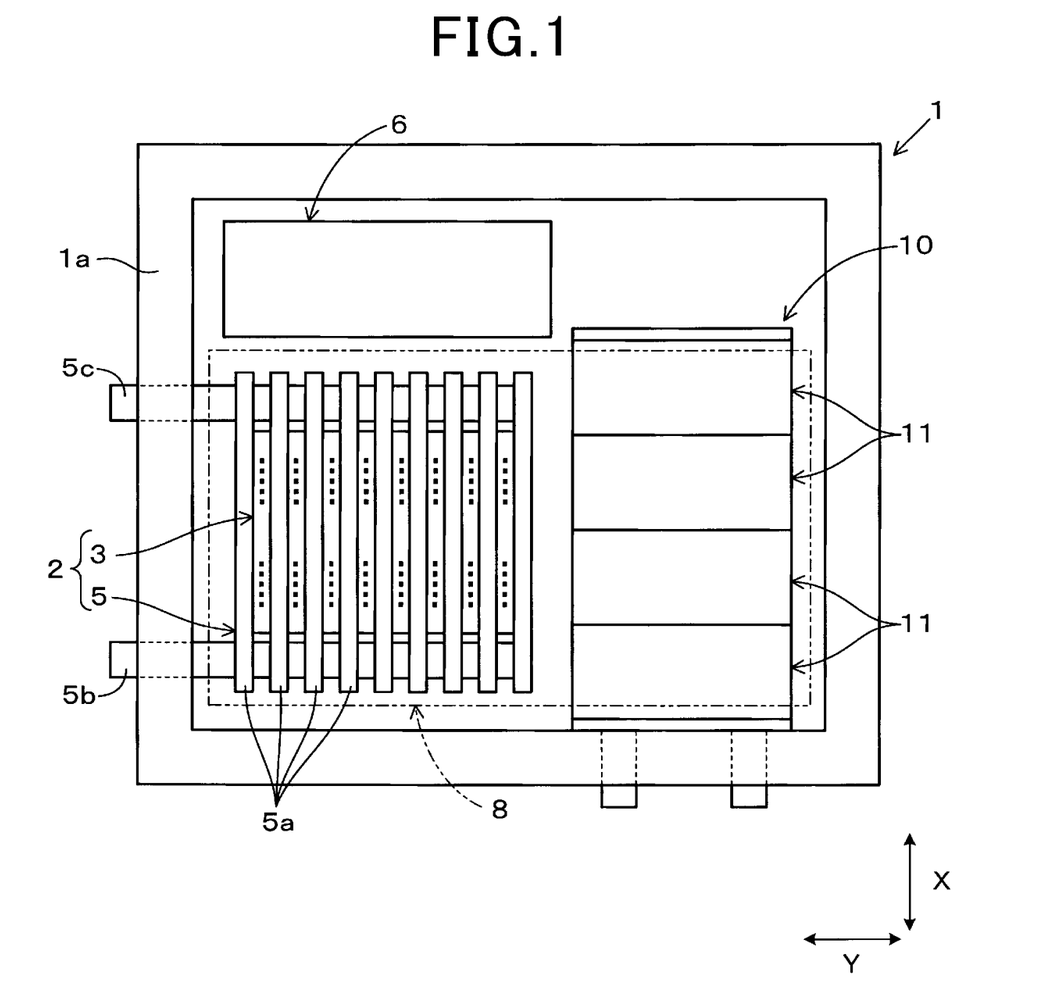
FIG. 1 is a plan view schematically showing a power conversion apparatus according to a first embodiment.

As illustrated in FIG. 1, a power conversion apparatus 1 according to a first embodiment includes, in a case 1a, a semiconductor stacking unit 2, a plurality of reactors 11, electronic parts including a capacitor 6 and a converter 7 (see FIG. 3), and a control circuit board 8. The power conversion apparatus 1 is mounted in an electric automobile or hybrid automobile, for example, and is used as an inverter that converts direct-current power into alternating-current power necessary for driving a driving motor.

Figure 2:
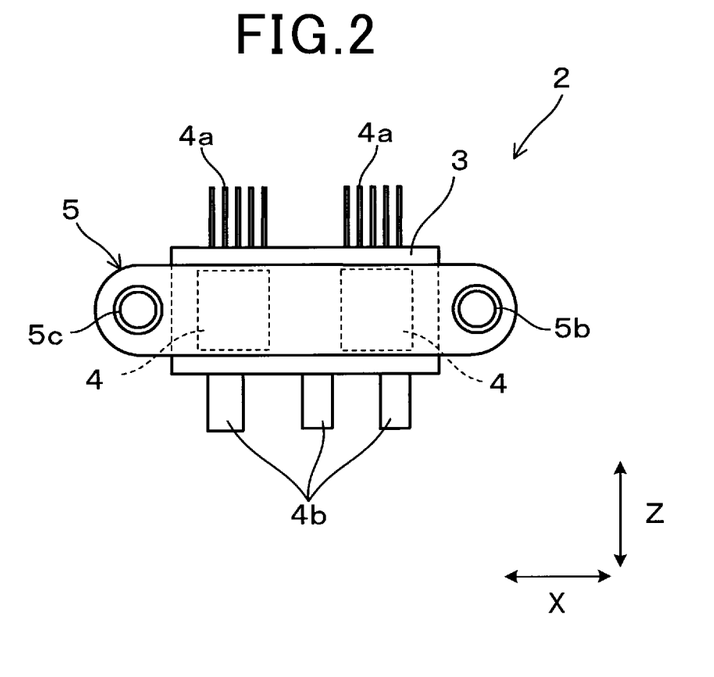
FIG. 2 is a view of a semiconductor stacking unit illustrated in FIG. 1 from a stacking direction of semiconductor modules.

The semiconductor stacking unit 2 includes a plurality of semiconductor modules 3 and a cooler 5 that has a plurality of cooling pipes 5a in which a refrigerant is to flow. In the semiconductor stacking unit 2, the plurality of semiconductor modules 3 and the plurality of (nine in FIG. 1) cooling pipes 5a are alternately stacked in the second direction Y. That is, each of the semiconductor modules 3 is sandwiched between two cooling pipes 5a from both side surfaces as seen in the second direction Y As illustrated in FIG. 2, each of the semiconductor modules 3 contains semiconductor elements 4 such as IGBTs that convert direct-current power into alternating-current power. The semiconductor module 3 includes a plurality of control terminals 4a electrically connected to the control circuit board 8 and power terminals 4b for power supply. The control circuit board 8 is configured to control switching operations of the semiconductor elements 4 to convert direct-current power supplied from the power terminal 4b to the semiconductor module 3 into alternating-current power.

The cooler 5 is configured such that the refrigerant flowing in through an inflow pipe 5b is branched and distributed into the plurality of cooling pipes 5a and then merges and flows out through an outflow pipe 5c. Thus, the heat generated in the semiconductor modules 3 moves toward the refrigerant flowing through the cooling pipes 5a, thereby to cool the semiconductor modules 3.

Examples of the refrigerant used in the cooler 5 include natural refrigerants such as water and ammonia, water mixed with ethylene glycol-based antifreeze, fluorocarbon-based refrigerants such as Fluorinert (registered trademark), CFC-based refrigerants such as HCFC123 and HFC134a, alcohol-based refrigerants such as methanol and alcohol, and ketone-based refrigerants such as acetone.

As illustrated in FIG. 1, the plurality of (four in FIG. 1) reactors 11 are stacked in the first direction X (hereinafter, also called "the stacking direction X of the reactors 11"). Each of the reactors 11 is an electronic part that performs the function of converting electric energy into magnetic energy using an inductor, and has a coil (a coil 17 described later) producing magnetic flux by energization. Together with the semiconductor modules 3, the four reactors 11 constitute part of an inverter circuit (an inverter circuit 30 described later) of the power conversion apparatus 1, more specifically, part of a booster circuit that raises an input voltage to the semiconductor modules 3.

In the present embodiment, the semiconductor elements 4 built in the semiconductor modules 3 are arranged along a plane orthogonal to the stacking direction X of the reactors 11, that is, along a plane defined by the second direction Y and the third direction Z. In other words, the element plane of the semiconductor elements 4 is orthogonal to the stacking direction X of the reactors 11. In this case, of magnetic fluxes produced by the coils of the reactors 11, the magnetic fluxes orthogonal to the element plane of the semiconductor elements 4 can be reduced. This prevents the semiconductor modules 3 from malfunctioning under the influence of these magnetic fluxes.

Although its detailed structure will be described later, the power conversion apparatus 1 of the present embodiment includes a reactor cooling structure 10 for cooling the four reactors 11.

The capacitor 6 is an electronic part that has the function of smoothing the input voltage or the raised voltage. The capacitor 6 constitutes part of a conversion circuit that converts direct-current power into alternating-current power. The converter 7 is an electronic part that has the function of lowering the voltage of the direct-current power source.

Figure 3:
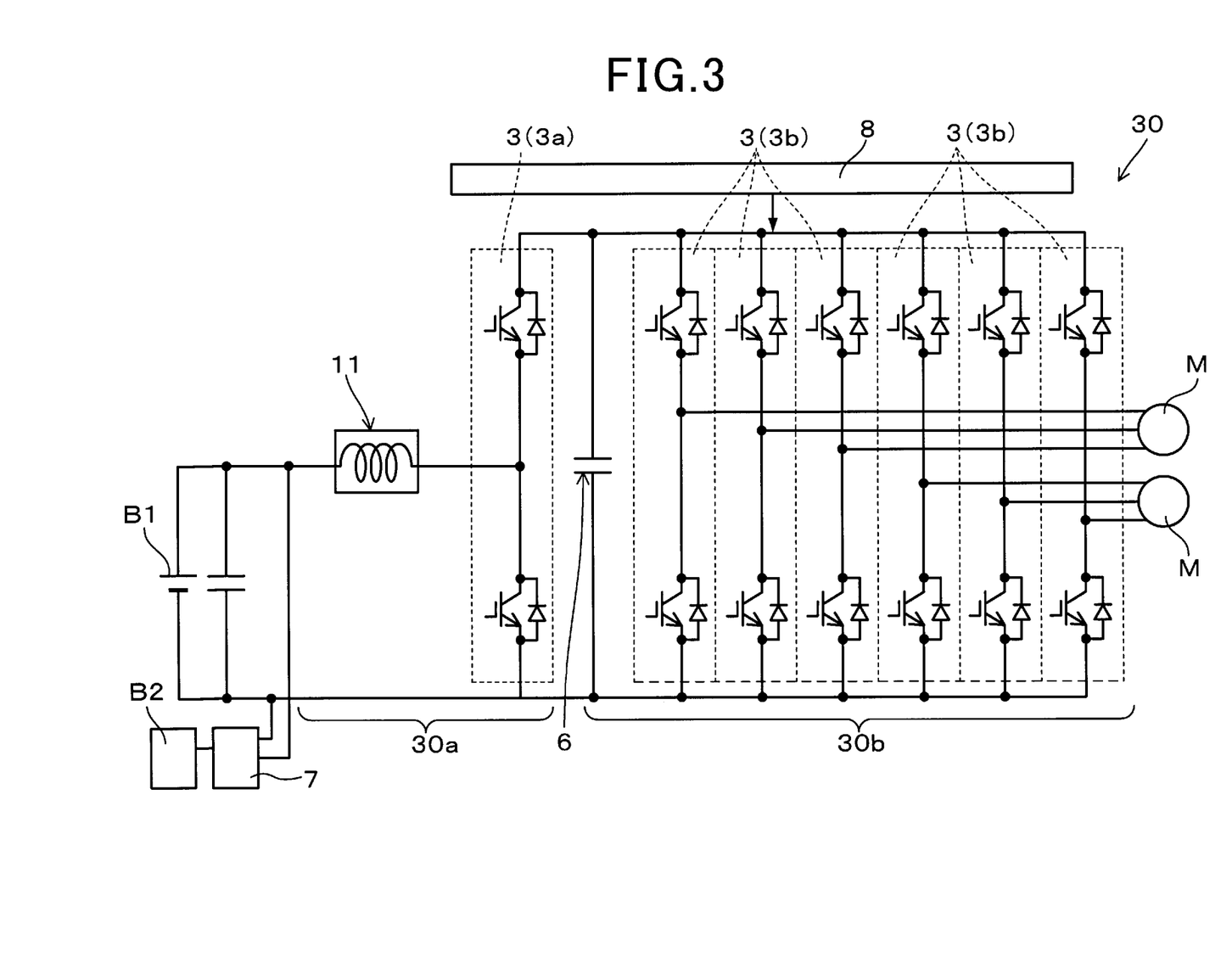
FIG. 3 is an inverter circuit diagram of the power conversion apparatus illustrated in FIG. 1.

As illustrated in FIG. 3, in the inverter circuit 30 of the power conversion apparatus 1, switching operations (on-off operations) of the semiconductor elements 4 built in each semiconductor module 3 are controlled by the control circuit board 8 so that the direct-current power of a power source B1 as a direct-current power source is converted into alternating-current power.

In the present embodiment, the reactor 11 and a semiconductor module 3a constitute a booster unit 30a of the inverter circuit 30. The booster unit 30a has the function of raising the voltage of the power source B1. For the convenience of description, FIG. 3 illustrates only one booster unit 30a, but in actuality, four booster units 30a are connected in parallel according to the number of the reactors 11 illustrated in FIG. 1.

On the other hand, the capacitor 6 and the semiconductor modules 3b constitute a conversion unit 30b of the inverter circuit 30. The conversion unit 30b has the function of converting the direct-current power after pressure rise by the booster unit 30a into alternating-current power. Three-phase alternating-current motors M for vehicle running are driven by the alternating-current power obtained by the conversion unit 30b.

FIG. 3 illustrates a case in which the inverter circuit 30 has the two conversion units 30b such that two three-phase alternating-current motors M are driven accordingly. Instead of this, the number of the conversion unit 30b may be one such that one three-phase alternating-current motor M is driven accordingly.

The converter 7 is connected to the power source B1 and is used to lower the voltage of the power source B1 and charge an auxiliary battery B2 lower in voltage than the power source B1. The auxiliary battery B2 is used as a power source for various devices mounted on the vehicle.

The numbers and layout of the elements constituting the inverter circuit 30 are not limited to those illustrated in FIG. 3 but can be appropriately changed as necessary.

Next, the reactor cooling structure 10 will be described with reference to FIGS. 4 to 8.

Figure 4:
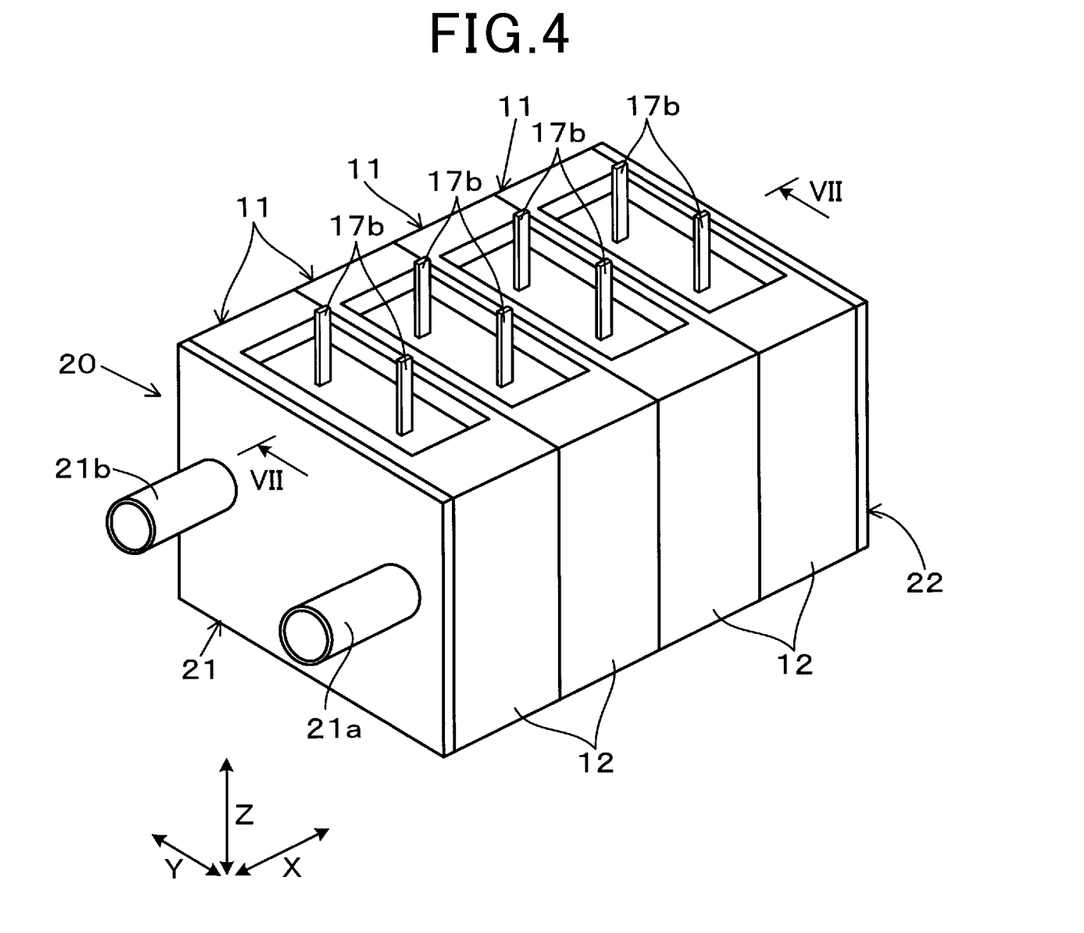
FIG. 4 is a perspective view of a reactor cooling structure according to the first embodiment.

As illustrated in FIG. 4, the reactor cooling structure 10 includes the four reactors 11 and a cooling mechanism 20 cooling the four reactors 11.

The number of the reactors 11 stacked is not limited to four but can be appropriately set as necessary.

Figure 5:
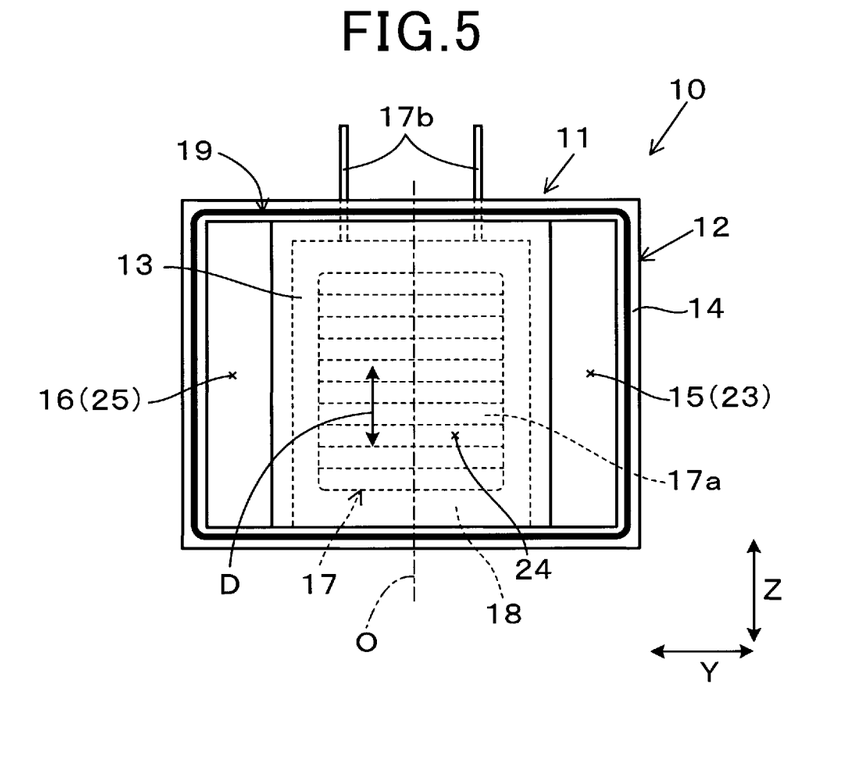
FIG. 5 is a view of a reactor illustrated in FIG. 4 as seen from a stacking direction of reactors.

As illustrated in FIGS. 4 and 5, each of the reactors 11 is configured so as to have a substantially symmetrical shape in the stacking direction X, i.e. front-back, and in the second direction Y, i.e. left-right.

As illustrated in FIG. 5, each of the reactors 11 has a coil 17 producing magnetic flux by energization. The coil 17 is a cylindrical air-core coil that has a winding part 17a with a lead wire wound around a winding axis O extending in a winding axis direction D and a pair of external connection terminals 17b and 17b constituting both end portions of the winding part 17a. In this case, the winding axis direction D of the coil 17 aligns with the third direction Z. The coil 17 is connected to the power source B1 (see FIG. 3) via the pair of external connection terminals 17b and 17b.

Figure 6:
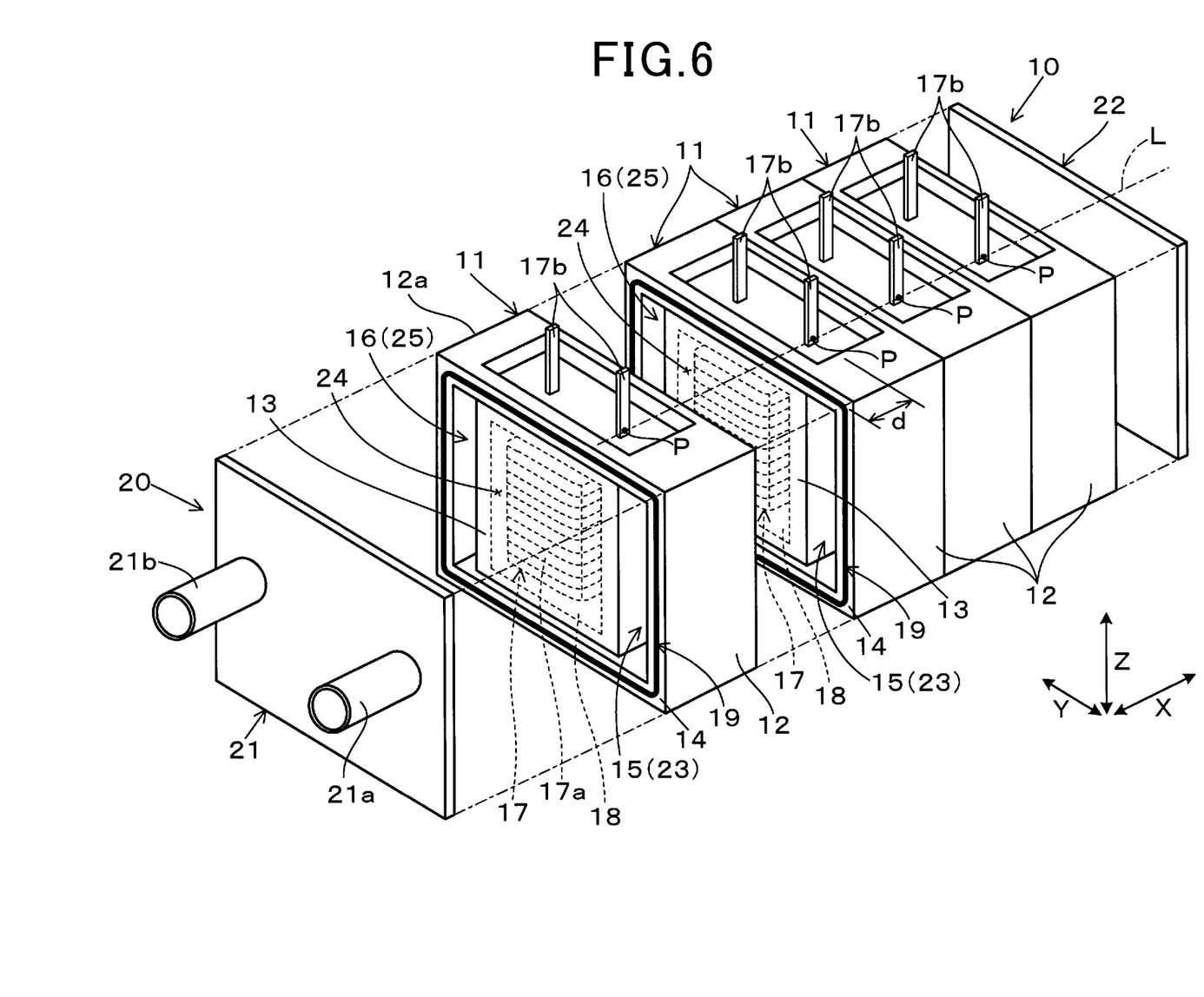
FIG. 6 is an exploded perspective view of the reactor cooling structure illustrated in FIG. 4.

The external connection terminals 17b of the coil 17 protrude upward from the top of the reactor 11. As illustrated in FIG. 6, when the protrusion position of one of the pair of external connection terminals 17b is designated as P, the protrusion position P of this external connection terminal 17b in each coil 17 passes through a virtual straight line L extending along the stacking direction X. That is, one coil 17 has the external connection terminal 17b protruding from the position overlapping with the external connection terminals 17b of the other coils 17 as seen in the stacking direction X of the reactors 11. According to this configuration, in the structure in which the plurality of reactors 11 is stacked, the external connection terminals 17b of the coils 17 of each reactor 11 can be easily connected together.

In relation to this configuration, when it is less needed to consider the ease of connecting the external connection terminals 17b, for example, the protrusion positions P of the external connection terminals 17b of each coil 17 may be shifted from the virtual straight line L.

The protrusion position P of one of the pair of external connection terminals 17b is separated by a distance d from a seal member 19 described later in the stacking direction X of the reactors 11. That is, each of the coils 17 has the external connection terminal 17b protruding from the position separated from the seal member 19 in the stacking direction X of the reactors 11. According to this configuration, stress generated in the seal member 19 by adhering and joining together two adjacent reactors 11 in the stacking direction X is less likely to transfer to the external connection terminals 17b of the coils 17.

In relation to this configuration, when it is less needed to consider the stress generated in the seal member 19, for example, the distance from the seal member 19 to the protrusion position P of the external connection terminal 17b can be shortened.

Each of the four reactors 11 has an exterior member 12 as an exterior case forming its outline. The exterior member 12 has heat radiation surfaces 13 respectively on both sides of the corresponding one of the reactors in a stacking direction of the stacked reactors, and the heat radiation surfaces 13 of the exterior member 12 of each of the reactors is arranged to cool the coil 17 of the corresponding one of the reactors. The heat radiation surfaces 13 may be flat surfaces or may be concave-convex surfaces on which heat radiation fins are provided to increase the area of contact with the refrigerant.

The exterior member 12 has a substantially rectangular parallelepiped shape, and has lateral sides 12a, a lateral direction along each of the lateral sides being orthogonal to the heat radiation surfaces 13. The four reactors are stacked such that the lateral directions of the external members 12 are aligned as the stacking direction X. In this case, the heat radiation surfaces 13 of the exterior member 12 are provided on relatively wide planes formed by the sides other than the lateral sides 12a. Therefore, the area of the heat radiation surface 13 can be increased as compared to the case where the heat radiation surfaces 13 are provided on other planes, which is advantageous in heat exchange with the refrigerant.

In the exterior member 12 of each of the reactors 11, a core 18 made of a magnetic powder-mixed resin is arranged inside and outside of the coil 17. That is, the coil 17 and the core 18 are housed in an integrated state in the exterior member 12. In this case, the coil 17 and the core 18 may be integrated and then housed in the exterior member 12 or may be arranged in the exterior member 12 by insert molding.

Each of the four reactors 11 is configured such that the lateral direction of the exterior member 12 (the stacking direction X of the reactors 11) and the winding axis direction D of the coil 17 are orthogonal to each other. According to this configuration, the heat radiation surfaces 13 of the exterior member 12 are opposed to the side surfaces of the winding part 17a of the coil 17 respectively so that the coil 17 can be efficiently cooled from the radial outside of the winding part 17a.

Each of the exterior members 12 is made from a heat-conductive resin material, that is, a resin material with relatively high heat conductivity. Using the exterior member 12 made from a resin material makes it possible to reduce the cost of the reactors 11 as compared to the case of using a metal material, for example. In addition, using a resin material with relatively high heat conductivity for the exterior member 12 makes it possible to enhance heat radiation performance for cooling the coil 17.

As the heat-conductive resin material, typically, a polyphenylene sulfide (PPS) resin or nylon resin or the like containing a heat-conductive filler can be used.

As illustrated in FIG. 6, the cooling mechanism 20 is formed from the exterior member 12 of the reactor 11, a first lid member 21, and a second lid member 22.

Of the four exterior members 12, two adjacent exterior members 12 are configured such that a joint surface 14 of one exterior member 12 and a joint surface 14 of the other exterior member 12 are joined to each other via a seal member 19. The seal member 19 is made from a part or material excellent in liquid sealing property to the refrigerant. According to this configuration, the two adjacent exterior members 12 are fixed together by surface contact between the joint surfaces 14 and thus are improved in rigidity at the time of fixation.

By joining together the joint surfaces 14, a cooling flow path 24 for directly cooling the heat radiation surfaces 13 of the exterior members 12 by the refrigerant is formed at a position facing the heat radiation surfaces 13 of the exterior members 12. The cooling flow path 24 is partitioned by the two opposing heat radiation surfaces 13. The cooling flow path 24 is a closed flow path formed by the two adjacent exterior members 12. According to this configuration, it is possible to form the cooling flow path 24 without adding another member between the two heat radiation surfaces 13.

In this cooling flow path 24, the refrigerant directly contacts the heat radiation surfaces 13 of the exterior members 12. In the present embodiment, the same refrigerant as that used in the cooler 5 described above is flown into the cooling flow path 24 as well.

The stacking direction X has opposing first and second sides. The four exterior members 12 include a first exterior member 12 located to be closer to the first side of the stacking direction X than the second side thereof. A first lid member 21 is a flat plate-like member and is joined to the joint surface 14 of the first exterior member 12, with the seal member 19 therebetween. By this joint, one opening portion in the first side exterior member 12 is covered with the first lid member 21, and a cooling flow path 24 is formed between the heat radiation surface 13 of the first exterior member 12 and the first lid member 21 for directly cooling the heat radiation surface 13 by the refrigerant.

The first lid member 21 includes an inflow pipe 21*a* and an outflow pipe 21*b* penetrating therethrough. The inflow pipe 21*a* and the outflow pipe 21*b* are separated from each other at a predetermined distance in the second direction Y, and are both formed as pipe-like members extending in the stacking direction X of the reactors 11. Accordingly, the refrigerant flows into the cooling mechanism 20 through the inflow pipe 21*a* and flows out of the cooling mechanism 20 through the outflow pipe 21*b*.

A second lid member 22 is a flat plate-like member as the first lid member 21 is, but does not include the inflow pipe 21*a* and the outflow pipe 21*b*. The four exterior members 12 include a second exterior member 12 located to be closer to the second side of the stacking direction X than the first side thereof. The second lid member 22 is joined to the joint surface 14 of the second side exterior member 12 with the seal member 19 therebetween. By this joint, one opening portion in the second side exterior member 12 is covered with the second lid member 22, and a cooling flow path 24 is formed between the heat radiation surface 13 of the second side exterior member 12 and the second lid member 22 for directly cooling the heat radiation surface 13 by the refrigerant.

In the present embodiment, each exterior member 12 has communication holes 15 and 16 that communicate with the cooling flow path 24 respectively on both sides thereof in the second direction Y. The communication holes 15 and 16 penetrate through the exterior members 12 in the stacking direction X of the reactors 11.

Figure 7:
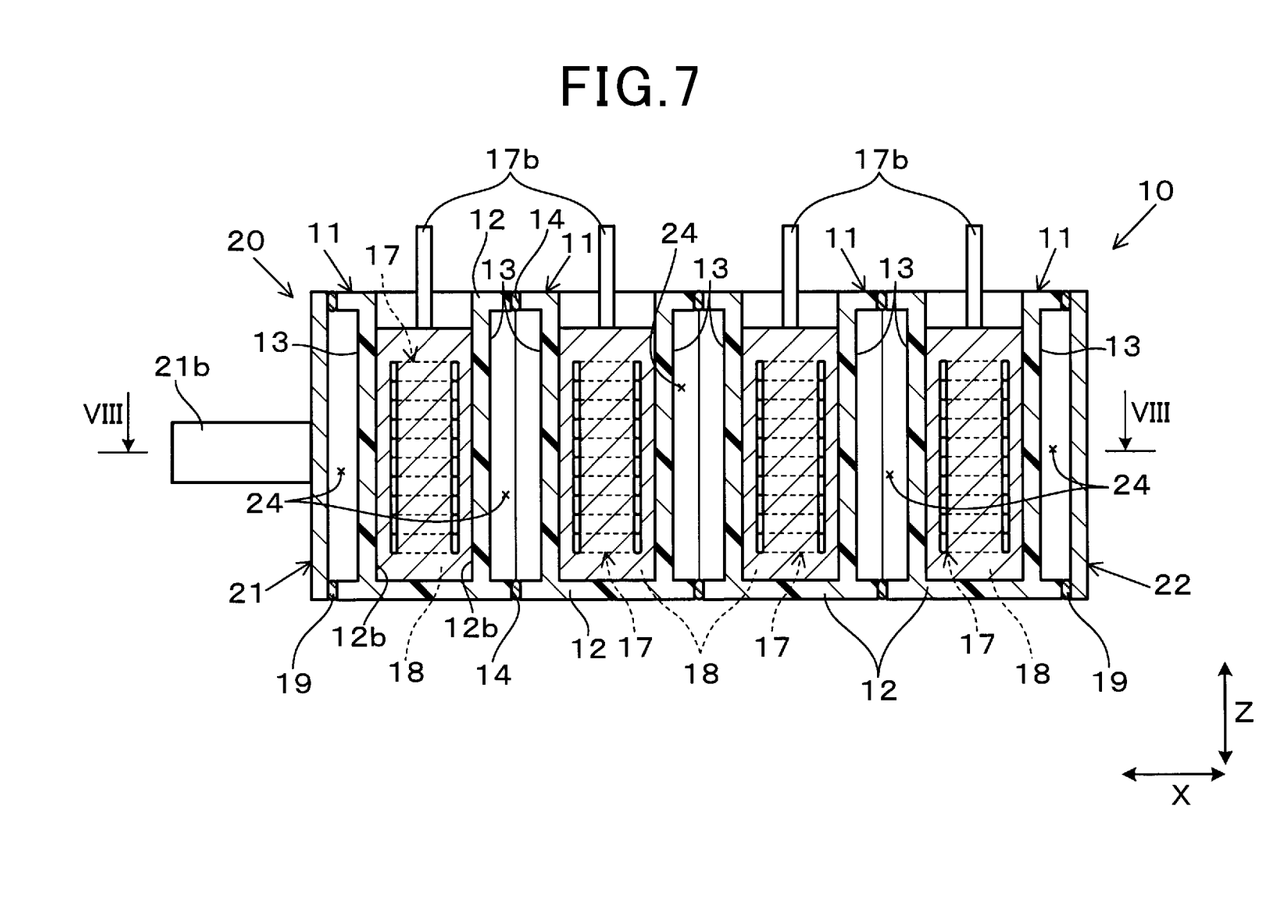
FIG. 7 is a cross-sectional view of FIG. 4 taken along a line VII-VII of FIG. 4.

As illustrated in FIG. 7, joining together the four exterior members 12 and the two lid members 21 and 22 makes it possible to form the five parallel cooling flow paths 24 extending in the second direction Y with a space left therebetween in the first direction X.

The external member 12 of each of the reactors has inner wall surfaces 12*b* in the stacking direction, the inner wall surfaces 12*b* being arranged to face the heat radiation surfaces 13; and the core 18 is arranged to be in contact with the inner wall surfaces 12*b* of the exterior member 12. According to this configuration, closely adhering the core 18 to the inner wall surfaces 12*b* of the exterior member 12 facilitates the movement of heat of the core 18 from the inner wall surfaces 12*b* of the exterior member 12 to the heat radiation surfaces 13, thereby achieving effective cooling of the core 18.

Figure 8:
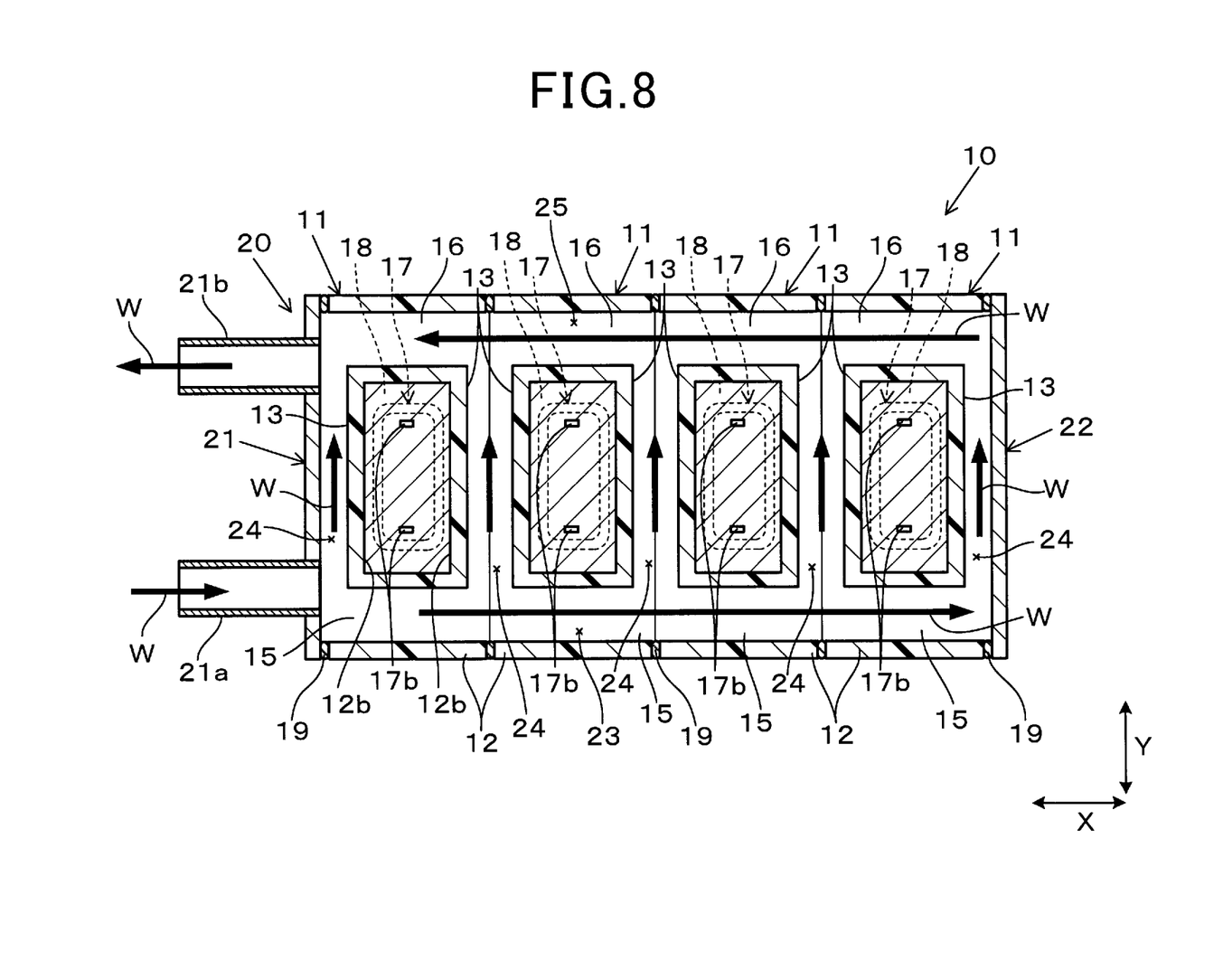
FIG. 8 is a cross-sectional view of FIG. 7 taken along a line VIII-VIII of FIG. 7.

As illustrated in FIG. 8, the communication hole 15 in each of the four exterior members 12 overlaps one another to form a refrigerant introduction flow path 23 linearly extending in the stacking direction X of the reactors 11. The refrigerant introduction flow path 23 is arranged on the extension line of the inflow pipe 21*a*. Accordingly, the refrigerant W having entered into the cooling mechanism 20 through the inflow pipe 21*a* flows through the refrigerant introduction flow path 23 from the first lid member 21 side to the second lid member 22 side.

In addition, the communication hole 16 in each of the four exterior members 12 overlaps one another to form a refrigerant discharge flow path 25 linearly extending in the stacking direction X of the reactors 11. The refrigerant discharge flow path 25 is arranged on the extension line of the outflow pipe 21*b*. Accordingly, the refrigerant W having flowed through the refrigerant discharge flow path 25 from the second lid member 22 side to the first lid member 21 side then flows out of the cooling mechanism 20 through the outflow pipe 21*b*.

Further, the communication holes 15 and the communication holes 16 in each exterior member 12 communicates with the corresponding cooling flow paths 24. That is, the refrigerant introduction flow path 23 and the refrigerant discharge flow path 25 communicate with each other through each cooling flow path 24. In this case, the refrigerant introduction flow path 23 is a flow path for introducing the refrigerant W to each cooling flow path 24, and the refrigerant discharge flow path 25 is a flow path for deviating the refrigerant W from each cooling flow path 24.

Accordingly, the refrigerant W in the refrigerant introduction flow path 23 is branched from the refrigerant introduction flow path 23 and flows into each cooling flow path 24. In each cooling flow path 24, the heat radiation surfaces 13 of the exterior member 12 directly contact the refrigerant W to transfer the heat of the heat radiation surfaces 13 to the refrigerant W. Then, the refrigerant W flows from each cooling flow path 24 in parallel toward the refrigerant discharge flow path 25.

As described above, providing the exterior members 12 with the communication holes 15 and 16 makes it possible to form the refrigerant introduction flow path 23, the parallel cooling flow paths 24, and the refrigerant discharge flow path 25 without adding any other member. This allows the reactor cooling structure 10 to be miniaturized while decreasing the parts count and reducing costs.

Next, operations and effects of the first embodiment will be described.

In the reactor cooling structure 10, the refrigerant W directly cools the heat radiation surfaces 13 of the exterior member 12 of each reactor 11. In this case, the refrigerant W flowing in the cooling flow paths 24 of the cooling mechanism 20 directly contacts the heat radiation surfaces 13 of the exterior member 12. That is, there is no member interposed between the heat radiation surfaces 13 of the exterior member 12 and the refrigerant W flowing in the cooling flow paths 24. This makes it possible to enhance performance in cooling the reactors 11 as compared to the structure in which another member is interposed between the heat radiation surfaces 13 of the exterior member 12 and the refrigerant W. In addition, for the enhancement of the performance, there is no need to press the exterior member 12 of the reactor 11 to press the exterior member 12 against the cooling mechanism 20.

In addition, the dimension of the reactor cooling structure 10 in the stacking direction X of the reactors 11 can be reduced due to the absence of another member interposed between the heat radiation surfaces 13 of the exterior members 12 and the refrigerant W.

As a result, it is possible to provide the reactor cooling structure 10 that exerts high cooling performance and is effective for miniaturization.

Hereinafter, other embodiments relating to the first embodiment will be described with reference to the drawings. In the other embodiments, the elements identical to the elements of the first embodiment will be given identical reference signs and duplicated descriptions of the same elements will be omitted.

Second Embodiment

Figure 9:
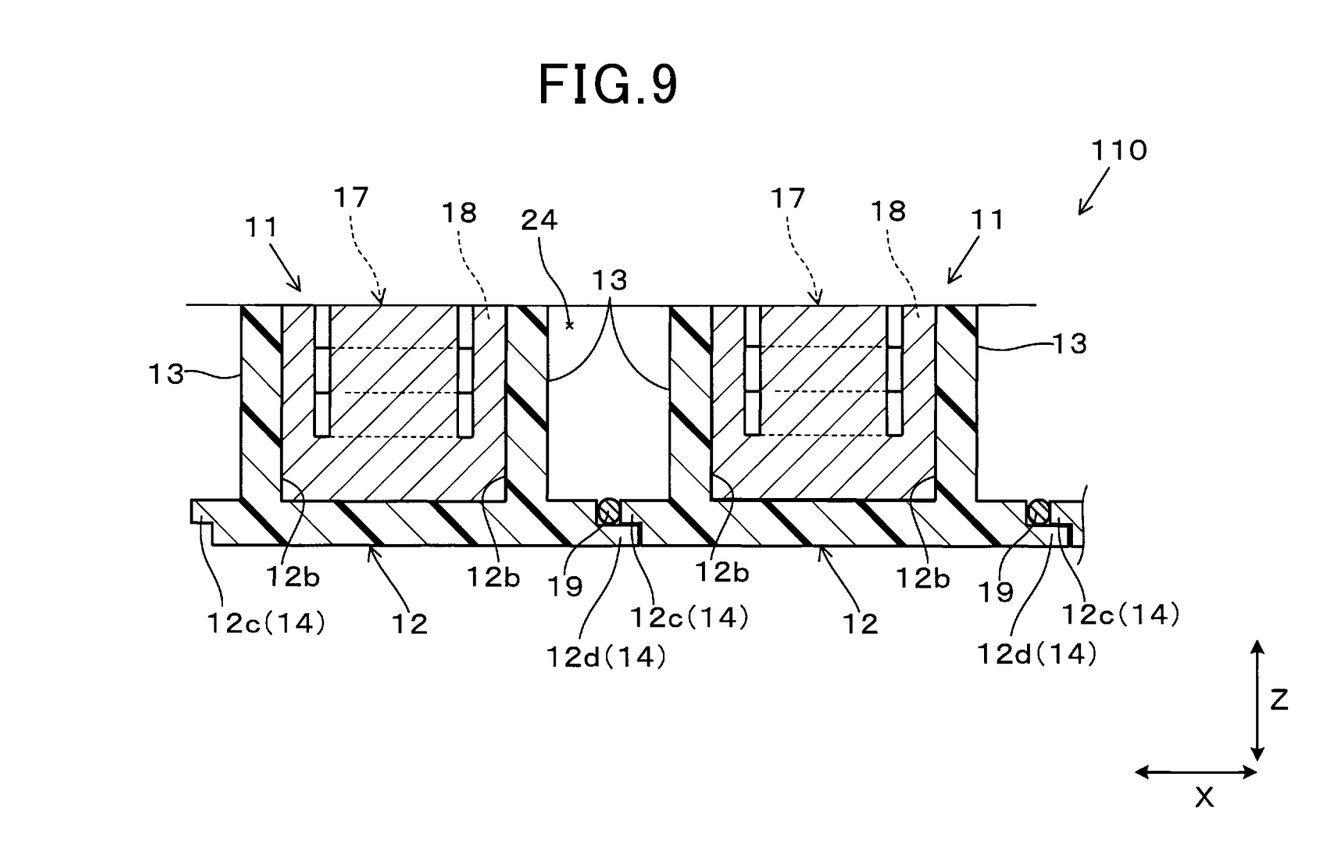
FIG. 9 is a partial cross-sectional view of a reactor cooling structure according to a second embodiment.

A reactor cooling structure 110 according to a second embodiment is different from the reactor cooling structure 10 according to the first embodiment in the structure of joint surfaces 14 of exterior member 12 of each reactor 11.

Other components are the same as those of the first embodiment.

FIG. 9 illustrates part of a cross section of the reactor cooling structure 110 corresponding to FIG. 7 illustrating the first embodiment. As illustrated in FIG. 9, in the reactor cooling structure 110, the reactors 11 include a first reactor 11 and a second reactor 11 adjacent to each other in the stacking direction X, the exterior member of the first reactor and the exterior member of the second reactor respectively have joint surfaces to join to each other. Specifically, one of the joint surface 14 of the exterior member 12 of the first reactor 11 and the joint surface 14 of the exterior member 12 of the second reactor 11 is engaged with the other thereof to thereby join the exterior member of the first reactor to the exterior member of the second reactor, by engaging a step portion 12c provided on the joint surface 14 of the exterior member 12 of the first reactor 11 with a step portion 12d provided on the joint surface 14 of the exterior member 12 of the second reactor 11.

According to the reactor cooling structure 110 of the second embodiment, the adjacent exterior member 12 of the first reactor and exterior member 12 of the second reactor respectively have joint surfaces 14 to engage with each other, whereby the reactors 11 can be firmly held.

Besides, the second embodiment produces the same operations and effects as those of the first embodiment.

Third Embodiment

Figure 10:
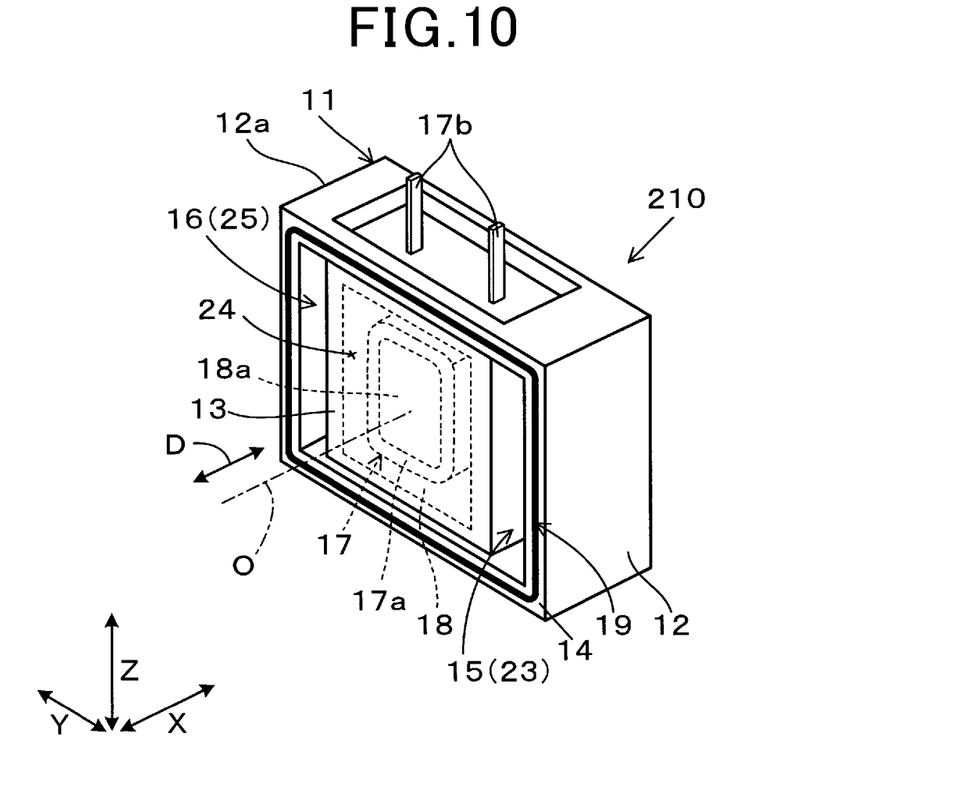
FIG. 10 is a perspective view of a reactor in a reactor cooling structure according to a third embodiment.

A reactor cooling structure 210 according to a third embodiment is different from the reactor cooling structure 10 according to the first embodiment in the arrangement of a coil 17 in each of reactors 11.

Other components are the same as those of the first embodiment.

As illustrated in FIG. 10, in the reactor cooling structure 210, a winding axis O of a winding part 17a of a coil 17 extends in a lateral direction of an exterior member 12 (a stacking direction X of the reactors 11). In this case, the reactor 11 is configured such that the lateral direction of the exterior member 12 is arranged to align with a winding axis direction D of the coil 17. Instead of this configuration, the coil 17 can be arranged such that the winding axis direction D extends in the second direction Y.

According to the reactor cooling structure 210 of the third embodiment, the heat radiation surfaces 13 of the exterior member 12 are opposed to an inner core part 18a of a core 18, the inner core part 18a being inside the winding part 17a of the coil 17. So the inner core part 18a can be efficiently cooled.

Besides, the third embodiment produces the same operations and effects as those of the first embodiment.

The present disclosure has been described so far according to the embodiments, but it is noted that the present disclosure is not limited to the foregoing embodiments or structures. The present disclosure includes various modifications and changes in a range of equivalency. In addition, various combinations and modes, and other combinations and modes including only one element of the foregoing combinations and modes, less or more than the one element are included in the scope and conceptual range of the present disclosure.

In the foregoing embodiments, the exterior members 12 are provided with the communication holes 15 and 16. Instead of this, the exterior members 12 can be provided with either one of the communication holes 15 and 16. Otherwise, the exterior members 12 may not be provided with both the communication holes 15 and 16 but another member may be attached to the exterior members 12 to form communication holes corresponding to the communication holes 15 and 16.

In the foregoing embodiments, the cooling flow paths 24 are defined by the two opposing heat radiation surfaces 13. Instead of this, the cooling flow paths 24 can be defined by adding another element to the two opposing heat radiation surfaces 13.

In the foregoing embodiments, the exterior members 12 of the reactors 11 are made from a heat-conductive resin material. Instead of this, the exterior members 12 can be made from a resin material that is hardly heat-conductive such as a resin material with relatively low heat conductivity. This resin material is typically a polyphenylene sulfide (PPS) resin or nylon resin not containing a heat-conductive filler.

In either the case where the resin material is heat-conductive or the case where the resin material is hardly heat-conductive, the resin material preferably contains an electrical insulating filler. This makes it possible to provide the exterior members 12 with an electrical insulating function.

Instead of this, in either the case where the resin material is heat-conductive or the case where the resin material is hardly heat-conductive, when the electrical insulation can be secured by another means or when no electrical insulation is needed, the exterior members 12 can be made from a resin material containing an electrically conductive filler.

Further, the exterior members 12 can be made from a metal material. In this case, the metal material is typically an aluminum-based material. Using a highly heat-conductive metal material makes it possible to increase the amount of heat transfer between the reactors 11 and the refrigerant in the cooling mechanism 20, thereby enhancing the cooling efficiency of the reactors 11.

In the foregoing embodiments, the exterior members 12 of the reactors 11 have a substantially rectangular parallelepiped shape. However, the shape of the exterior members 12 is not limited to this and can be any other shape as necessary. In addition, when the exterior members 12 of the reactors 11 have a substantially rectangular parallelepiped shape, instead of the mode in which the lateral direction of the exterior members 12 aligns with the stacking direction X of the reactors 11, the mode in which the lateral direction of the exterior members 12 is orthogonal to the stacking direction X of the reactors 11 can be employed.

In the foregoing embodiments, the core 18 of each of the reactors 11 is in contact with the inner wall surfaces 12*b* of the exterior member 12. Instead of this, there may be created a space between the core 18 and the inner wall surfaces 12*b* of the exterior member 12.

In the foregoing embodiments, the semiconductor elements 4 in the semiconductor modules 3 are arranged along a plane orthogonal to the stacking direction X of the reactors 11. For example, when it is less needed to consider the influence of magnetic flux produced in the coils 17 of the reactors 11, the semiconductor elements 4 in the semiconductor modules 3 can be arranged along a plane other than the plane orthogonal to the stacking direction X of the reactors 11.

What is claimed is:

1. A reactor cooling structure comprising:
    a plurality of reactors that are stacked on one another in a stacking direction, each reactor including a coil, which is configured to produce magnetic flux when energized, and a core integrated with the coil; and
    a cooling mechanism that cools the plurality of reactors, wherein:
    each of the reactors has an exterior member housing the coil and the core of the reactor, the exterior member having:
        first heat radiation surfaces respectively provided on both sides of the corresponding one of the reactors in the stacking direction of the stacked reactors; and
        second heat radiation surfaces respectively provided on both sides of the corresponding reactor in a direction perpendicular to the stacking direction,
        the first and second heat radiation surfaces being arranged to cool the coil of the corresponding reactor;
    the cooling mechanism includes a cooling flow path for directly cooling by a refrigerant the first and second heat radiation surfaces of the exterior member of each of the reactors;
    all the first and second heat radiation surfaces of each of the reactors (i) are arranged to face the cooling flow path and (ii) are made of a predetermined material;
    the plurality of reactors include a first reactor and a second reactor adjacent to each other in the stacking direction;
    the exterior member of the first reactor and the exterior member of the second reactor respectively have joint surfaces to join to each other;
    one of the heat radiation surfaces of the first reactor and one of the heat radiation surfaces of the second reactor are respectively arranged as first and second adjacent heat radiation surfaces to face each other; and
    the first and second adjacent heat radiation surfaces partition a part of the cooling flow path of the cooling mechanism.

2. The reactor cooling structure according to claim 1, wherein,
    one of the joint surface of the exterior member of the first reactor and the joint surface of the exterior member of the second reactor is engaged with the other thereof to thereby join the exterior member of the first reactor to the exterior member of the second reactor.

3. The reactor cooling structure according to claim 1, wherein,
    the joint surface of the exterior member of the first reactor and the joint surface of the exterior member of the second reactor are sealed to each other via a seal member.

4. The reactor cooling structure according to claim 3, wherein the coil of each of the first and second reactors is configured to have an external connection terminal for connection to a power source, and the external connection terminal of the coil of each of the first and second reactors protrudes from a position separated from the seal member as seen in the stacking direction.

5. The reactor cooling structure according to claim 1, wherein the coil of each of the reactors is configured to have an external connection terminal for connection to a power source, and the external connection terminal of the coil of each of the reactors protrudes from a predetermined position thereof, a position of the coil of each of the reactors being arranged to overlap the external connection terminal of the coil of another reactor in the stacking direction.

6. The reactor cooling structure according to claim 1, wherein,
    the exterior member of each of the reactors has a communication hole that communicates with the cooling flow path, and
    the communication hole constitutes at least one of:
        a refrigerant introduction flow path for introducing the refrigerant into the cooling flow path; and
        a refrigerant discharge flow path for discharging the refrigerant from the cooling flow path.

7. The reactor cooling structure according to claim 1, wherein the exterior member of each of the reactors is made from a resin material.

8. The reactor cooling structure according to claim 7, wherein the resin material has heat conductivity.

9. The reactor cooling structure according to claim 1, wherein the exterior member of each of the reactors is made from a metal material.

10. The reactor cooling structure according to claim 1, wherein
    the exterior member of each of the reactors has a substantially rectangular parallelepiped shape and has lateral sides, a lateral direction along each of the lateral sides being orthogonal to the first and second heat radiation surfaces of the exterior member of the corresponding one of the reactors, and
    the reactors are stacked such that the lateral directions of the external members of the respective reactors are aligned as the stacking direction.

11. The reactor cooling structure according to claim 10, wherein each of the reactors is configured such that the lateral direction of the exterior member of the corresponding one of the reactors is orthogonal to a winding axis direction of the coil of the corresponding one of the reactors.

12. The reactor cooling structure according to claim 10, wherein each of the reactors is configured such that the lateral direction of the exterior member of the corresponding one of the reactors is arranged to align with a winding axis direction of the coil of the corresponding one of the reactors.

13. The reactor cooling structure according to claim 1, wherein:
    the core of each of the plurality of reactors (i) is made of magnetic powder-mixed resin and (ii) is arranged inside and outside of the corresponding coil;
    the external member of each of the reactors has inner wall surfaces in the stacking direction, the inner wall surfaces of the external member of each of the reactors being arranged to face the respective first heat radiation surfaces of the external member of the corresponding one of the reactors; and the core of each of the reactors is arranged to be in contact with the inner wall surfaces of the exterior member of the corresponding one of the reactors.

14. The reactor cooling structure according to claim 1, wherein each of the reactors constitutes an inverter circuit of a power conversion apparatus together with a semiconductor module that contains a semiconductor element arranged along a plane orthogonal to the stacking direction.

15. A reactor cooling structure comprising:

a plurality of reactors that are stacked on one another in a stacking direction, each reactor including a coil, which is configured to produce magnetic flux when energized, and a core integrated with the coil; and a cooling mechanism that cools the plurality of reactors, wherein:

each of the reactors has an exterior member housing the coil and the core of the reactor, the exterior member having:

first heat radiation surfaces respectively provided on both sides of the corresponding one of the reactors in the stacking direction of the stacked reactors; and second heat radiation surfaces respectively provided on both sides of the corresponding reactor in a direction perpendicular to the stacking direction, the first and second heat radiation surfaces being arranged to cool the coil of the corresponding reactor;

the cooling mechanism includes a cooling flow path for directly cooling by a refrigerant the first and second heat radiation surfaces of the exterior member of each of the reactors;

all the first and second heat radiation surfaces of each of the reactors (i) are arranged to face the cooling flow path and (ii) are made of a predetermined material;

the core of each of the plurality of reactors (i) is made of magnetic powder-mixed resin and (ii) is arranged inside and outside of the corresponding coil;

the external member of each of the reactors has inner wall surfaces in the stacking direction, the inner wall surfaces of the external member of each of the reactors being arranged to face the respective first heat radiation surfaces of the external member of the corresponding one of the reactors; and the core of each of the reactors is arranged to be in contact with the inner wall surfaces of the exterior member of the corresponding one of the reactors.

\* \* \* \* \*